United States Patent
Liwicki et al.

(10) Patent No.: US 10,460,471 B2
(45) Date of Patent: Oct. 29, 2019

(54) CAMERA POSE ESTIMATING METHOD AND SYSTEM

(71) Applicant: KABUSHIKI KAISHA TOSHIBA, Minato-ku (JP)

(72) Inventors: Stephan Liwicki, Cambridge (GB); Christopher Zach, Cambridge (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/653,158

(22) Filed: Jul. 18, 2017

(65) Prior Publication Data
US 2019/0026916 A1    Jan. 24, 2019

(51) Int. Cl.
*G06T 7/70* (2017.01)
*G06T 7/73* (2017.01)
*G06T 7/246* (2017.01)

(52) U.S. Cl.
CPC ............. *G06T 7/73* (2017.01); *G06T 7/246* (2017.01); *G06T 7/70* (2017.01); *G06T 2207/10016* (2013.01); *G06T 2207/30244* (2013.01)

(58) Field of Classification Search
CPC .. G06T 7/73; G06T 7/246; G06T 7/70; G06T 2207/30244; G06T 2207/10016
See application file for complete search history.

(56) References Cited

U.S. PATENT DOCUMENTS

| 6,504,569 | B1* | 1/2003 | Jasinschi | G06T 7/579 345/950 |
| 2014/0037136 | A1 | 2/2014 | Ramalingam et al. | |
| 2014/0168461 | A1* | 6/2014 | Dani | G01B 11/24 348/222.1 |

(Continued)

FOREIGN PATENT DOCUMENTS

JP    2014-32666    2/2014

OTHER PUBLICATIONS

Li et al. "Robust Monocular Visual Odometry using Optical Flows for Mobile Robots." 35th Chinese Control Conference, Jul. 27, 2016, pp. 6003-6007 (Year: 2016).*

(Continued)

*Primary Examiner* — Jon Chang
(74) *Attorney, Agent, or Firm* — Oblon, McClelland, Maier & Neustadt, L.L.P.

(57) ABSTRACT

A camera pose estimation method determines the translation and rotation between a first camera pose and a second camera pose. Features are extracted from a first image captured at the first position and a second image captured at the second position, the extracted features comprising location, scale information and a descriptor, the descriptor comprising information that allows a feature from the first image to be matched with a feature from the second image. Features are matched between the first image and the second image. The depth ratio of matched features is determined from the scale information. n matched features are selected, where at least one of the matched features is selected with (Continued)

both the depth ratio and location. The translation and rotation are calculated between the first camera pose and the second camera pose using the selected matched features with depth ratio derived from the scale information.

20 Claims, 12 Drawing Sheets

(56) References Cited

U.S. PATENT DOCUMENTS

| | | | | |
|---|---|---|---|---|
| 2016/0068114 A1* | 3/2016 | Liao | ............................ | G06T 7/73 348/148 |
| 2016/0350904 A1* | 12/2016 | Zhang | ...................... | G06T 17/00 |
| 2018/0031387 A1* | 2/2018 | Scherer | .................... | G01S 19/48 |

OTHER PUBLICATIONS

Japanese Office Action dated Apr. 16, 2019 in Japanese Application No. 2018-024896, 2 pages.
O. Chum and J. Matas. Randomized RANSAC with $T_{d,d}$ Test. In BMVC'02, pp. 448-457, 2002.
B. Clipp, C. Zach, J. Frahm, and M. Pollefeys. A New Minimal Solution to the Relative Pose of a Calibrated Stereo Camera with Small Field of View Overlap. In IEEE Int.Conf. Computer Vision, ICCV'09, pp. 1725-1732, 2009.
R. Hartley. In Defense of the Eight-Point Algorithm. IEEE Trans. Pattern Anal. Mach. Intell., 19(6):580-593, Jun. 1997.
R. Hartley and A. Zisserman. Multiple View Geometry in Computer Vision. Cambridge University Press, 2003, 655 pgs.
Z. Kukelova, M. Bujnak, and T. Pajdla. Automatic Generator of Minimal Problem Solvers. In ECCV'08, pp. 302-315, 2008.
G. Lee, F. Fraundorfer, and M. Polleyfeys. Motion Estimation for Self-Driving Cars with a Generalized Camera. In CVPR'13, 2013, 8 pgs.
B. Li, L. Heng, G. Lee, and M. Polleyfeys. A 4-Point Algorithm for Relative Pose Estimation of a Calibrated Camera with a Known Relative Rotation Angle. In IROS'13, pp. 1595-1601, 2013.
H. Li. A Simple Solution to the Six-Point Two-View Focal-Length Problem. In ECCV'06, pp. 200-213, 2006.
D. Lowe. Distinctive Image Features from Scale-Invariant Keypoints. Int. J. Comput. Vis., 60(2):91-110, 2004.
O. Naroditsky, X. Zhou, J. Gallier, S. Roumeliotis, and K. Daniilidis. Two Efficient Solutions for Visual Odometry using Directional Correspondence. IEEE Trans. Pattern Anal. Mach. Intell., 34(4):818-824, Apr. 2012.
D. Nistér. Preemptive RANSAC for Live Structure and Motion Estimation. In IEEE Int. Conf. Computer Vision, ICCV'03, pp. 199-206, 2003.
D. Nistér. An Efficient Solution to the Five-Point Relative Pose Problem. IEEE Trans. Pattern Anal. Mach. Intell., 26(6):756-770, Jun. 2004.
E. Rublee, V. Rabaud, K. Konolige, and G. Bradski. ORB: an efficient alternative to SIFT or SURF. In IEEE Int. Conf. Computer Vision, ICCV'11, pp. 2564-2571, 2011.
Scaramuzza. 1-Point-RANSAC Structure from Motion for Vehicle Mounted Cameras by Exploiting non-Holonomic Constraints. Int. J. Comput. Vis., 95(1):74-85, Jan. 2011.
H. Stewénius, D. Nistér, F. Kahl, and F. Schaffalitzky. A Minimal Solution for Relative Pose with Pose with Unknown Focal Length. Image and Vision Computing, 26(7):871-877, Jul. 2008.

* cited by examiner

Figure 4(a) 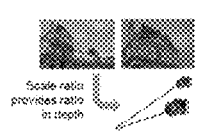 Figure 4(b) 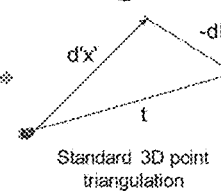 Figure 4(c) 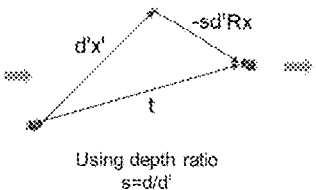 Figure 4(d) 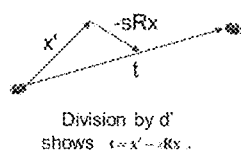
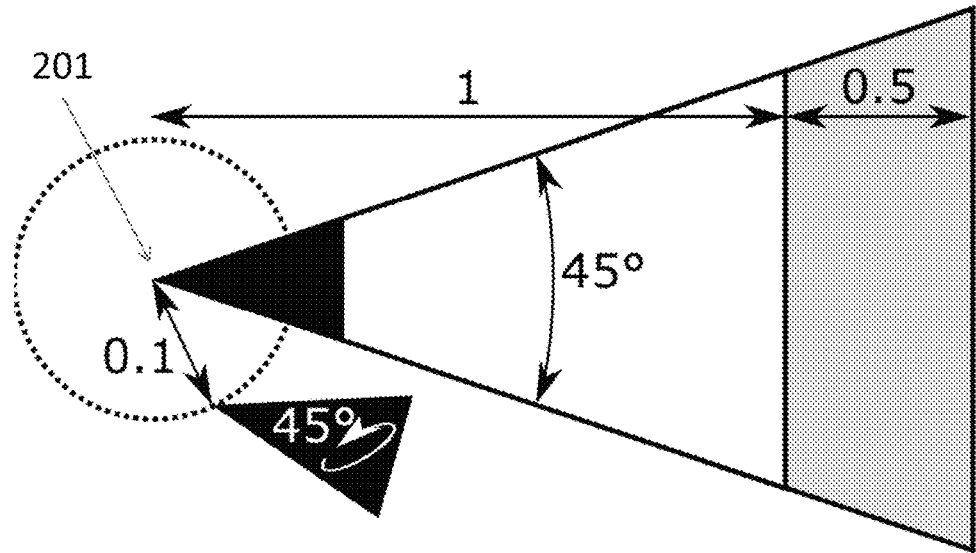
Figure 8

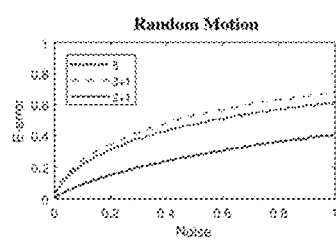
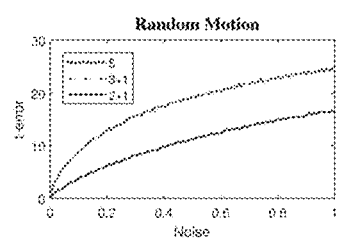
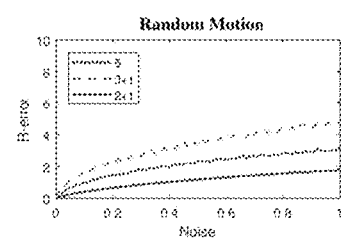
Figure 9(a)　　　　Figure 9(b)　　　　Figure 9(c)
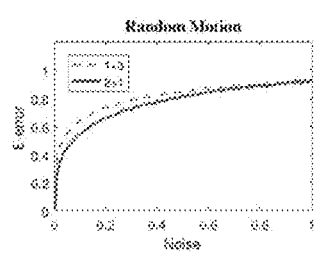
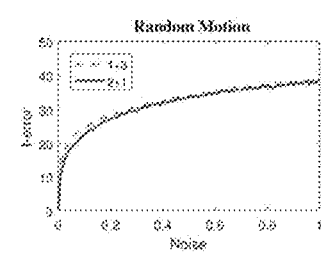
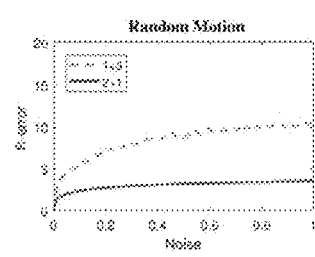
Figure 10(a)　　　　Figure 10(b)　　　　Figure 10(c)

CAMERA POSE ESTIMATING METHOD AND SYSTEM

FIELD

Embodiments described herein relate generally to the field of computer vision.

BACKGROUND

Relative pose estimation has been studied for centuries, first in the photographic and later in the computer vision community. Nevertheless, due to the fundamental relevance to many state-of-the-art applications in structure from motion and simultaneous localization and mapping, research is ever evolving in recent years. The core challenge of relative pose is to estimate the motion between two camera poses, revealing 3D reconstructions of the environment as well as camera odometry.

Classic approaches study the location of point correspondences in multiple views and their relationship to pose recovery. In the case of unknown intrinsic calibration, an 8 point algorithm or 7 point algorithm is most frequently employed to recover the fundamental matrix and a 6 point algorithm is used for unknown focal length. With calibrated cameras a 5 point algorithm is most suitable.

BRIEF DESCRIPTION OF THE FIGURES

FIG. 4(a) shows two images which are used to explain feature extraction;

FIG. 4(b) is a diagram of standard 3D point triangulation;

FIG. 4(c) is a diagram showing the use of the depth ratio in FIG. 4(b);

FIG. 4(d) is a diagram showing how the depth ratio can be used to reduce the number of unknowns from the arrangement of FIG. 4(b);

FIG. 8 is a diagram showing camera position and camera parameters;

FIGS. 9(a), (b) and (c) shows the obtained errors for the Essential Matrix, translation and rotation respectively with noise in location measurements;

FIGS. 10(a), (b) and (c) shows the obtained errors for the Essential Matrix, translation and rotation respectively with noise in location measurements;

DETAILED DESCRIPTION

Figure 1A:
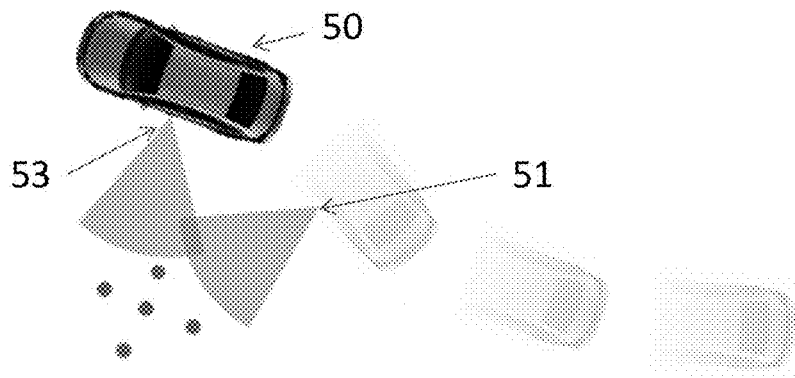
FIG. 1(a) is a schematic of a car with a camera.

In an embodiment, a camera pose estimation method for determining the translation and rotation between a first camera pose and a second camera pose is provided, the method comprising:
extracting features from a first image captured at the first position and a second image captured at the second position, the extracted features comprising location, scale information and a descriptor, the descriptor comprising information that allows a feature from the first image to be matched with a feature from the second image;

matching features between the first image and the second image to produce matched features;

determining the depth ratio of matched features from the scale information, wherein the depth ratio is the ratio of the depth of a matched feature from the first position to the depth of the matched feature from the second position;

selecting n matched features, where at least one of the matched features is selected with both the depth ratio and location; and calculating the translation and rotation between the first camera pose and the second camera pose using the selected matched features with depth ratio derived from the scale information.

Feature detectors find interest points in image data, such as corners, textures or regions with unique appearance. The feature detector can reproduce similar detections from alternative viewpoints. Example feature detectors include Fast, Harris Corners, Difference of Gaussians. Each of these is usually applied on scale space pyramids of the images and hence provides scale, or utilize depth sensors to estimate scale directly. Thus, the feature detector can give location and scale information.

Feature descriptors are used to describe the appearance of a feature, so that it can be compared to features of the second image. SIFT, SURF and ORB are known descriptors as they are fairly view direction independent.

By using depth information, it is possible to instead of using 5 points comprising location alone, to use a reduced number of points if the depth information is used from one or more of those points. The above method derives depth from the scale information derived during feature detection. The feature detector extracts position x, y and scale s. This information may be used to define a rectangle of a predefined sizes at location x, y. The rectangle is used to execute the feature descriptor.

Typically, during pose estimation using 5 points, only location or coordinate information is used. The scale information extracted during feature detection is discarded.

Thus, in an embodiment selecting the matched features comprises selecting n matched features, where n is an integer of 4 or less, in of said n matched features being selected with both information relating to the depth ratio and location and p features being selected with location information and not information relating to the depth ratio, m and p being integers satisfying the relation 2m+p=5.

The information relating to the depth ratio may be the scale ratio or the depth ratio itself may be directly extracted from the features. Throughout this specification, depth ratio and scale ratio are used interchanaeably.

In practice there may be errors when features are matched. Thus, in an embodiment, multiple estimates of the translation and rotation are obtained and the best estimate is selected. As this type of data is prone to outliers, a robust estimation framework can be used. Therefore, in a embodiment, the method further comprises refining a model using a robust estimator, wherein the model parameters are the calculated translation and rotation between the first camera position and the second camera position.

A possible estimation framework may comprise:
setting the model parameters as the best model parameters of a best model;
evaluating the fit of the best model;
selecting a new set of n matched features and calculating new model parameters to produce a new model;
evaluating the fit of the new model;
updating the best model parameters with the new model parameters if the fit of the new model is better than the fit of the best model; and
continually repeating the process of selecting a new set of n matched features to produce a new model, evaluating the fit of the new model and updating the best model parameters with the new model parameters if the fit of the new model is better than the fit of the best model until a stopping criteria is reached.

In a further embodiment, a Random Sample Consensus (RANSAC) type framework is used. Here, the fit is evaluated by calculating the number of inliers and each set of matched features are randomly selected.

In an embodiment, the number of inliers is calculated for both depth and location.

The stopping criteria can be determined in a number of ways. In an embodiment, there can be a fixed number of iterations or the process can be stopped when the likelihood of finding a better model falls below a threshold.

In high resolution images, feature detectors are fairly reliable for locations. Unfortunately, the estimation of scale is less stable and depends on the step-size used in the scale-space pyramid or the quality of the depth sensor.

In a further embodiment, it is assumed that there is an error in the information relating to the depth ratio of matched features,
wherein evaluating the fit of the model comprises evaluating the fit of the model for the depth ratio obtained from the features, the depth ratio with a positive error value and the depth ratio with a negative error value,
the method further comprising:
updating the depth ratio with one of the three values selected from depth ratio obtained from the features, the depth ratio with a positive error value and the depth ratio with a negative error value depending on which of the three values produced the best fit;
setting a new error value, the new error value being the current error value divided by 2;
and evaluating the fit of the model using the new error value.

The above methods can be used for:
1. Relative pose estimation with scale and location of correspondences
   a. SLAM (Simultaneous localization and mapping)
   b. 3D model generation
2. Odometry estimation for signal input
   a. Scale ratios from monocular camera
   b. Depth ratios from stereo camera or RGB-D cameras
3. Autonomous driving+driver assistance systems
   a. Fast estimation of the trajectory of the vehicle
   b. Estimation of the 3D position and 3D orientation of the vehicle In an embodiment, the first image is captured by a first camera and the second image is captured by a second camera, the first and second cameras being different. The method can cope with 2 different cameras as each camera has its own calibration matrix.

However, in many embodiments, the same camera will be used. The camera may be a video camera where the different images correspond to different frames. Such a camera can be provided on a moving vehicle, for example, car, lorry, robot, drone, household appliance etc.

The trajectory of the vehicle is determined from the calculated translation and rotation between the first camera pose and the second camera pose.

The method of estimating the camera pose can be used to determine the position of a camera in a so-called simultaneous localisation and mapping system (SLAM).

The above method may also be used to determine a 3D model of an object, the method comprising:
capturing a plurality of images of the object using a moving camera; and
generating a point cloud of the object, the point cloud being determined from triangulation using the pose of the camera,
wherein the pose of the camera is estimated according to the above method.

In a further embodiment, a camera pose estimation apparatus is provided for determining the translation and rotation between a first camera pose and a second camera pose,
the apparatus comprising a processor, the processor being adapted to:
extract features from a first image captured at the first position and a second image captured at the second position, the extracted features comprising location, scale information and a descriptor, the descriptor comprising information that allows a feature from the first image to be matched with a feature from the second image;
match features between the first image and the second image to produce matched features;
determine the depth ratio of matched features from the scale information, wherein the depth ratio is the ratio of the depth of a matched feature from the first position to the depth of the matched feature from the second position;
select n matched features, where at least one of the matched features is selected with both the depth ratio and location; and
calculate the translation and rotation between the first camera pose and the second camera pose using the selected matched features with depth ratio derived from the scale information.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1(a) shows the motion of a car 50. The car is provided with a camera. With the car moves, the camera captures images from different positions.

In the field of autonomous driving, or even for assisted parking, there is a need for a vehicle to be able to locate itself within its surroundings. For example, for a car to be able to drive along a road, the car needs to be able to take images of the road and determine the position of the car with respect to the road.

In FIG. 1(a), as an example, the car takes a first image (image 1) at position 51 and a second image (image 2) at position 53. Both images capture feature points 55. Feature points can then be matched between the 2 images and the pose of the camera from the first position to the $2^{nd}$ position can be determined.

Figure 1B:
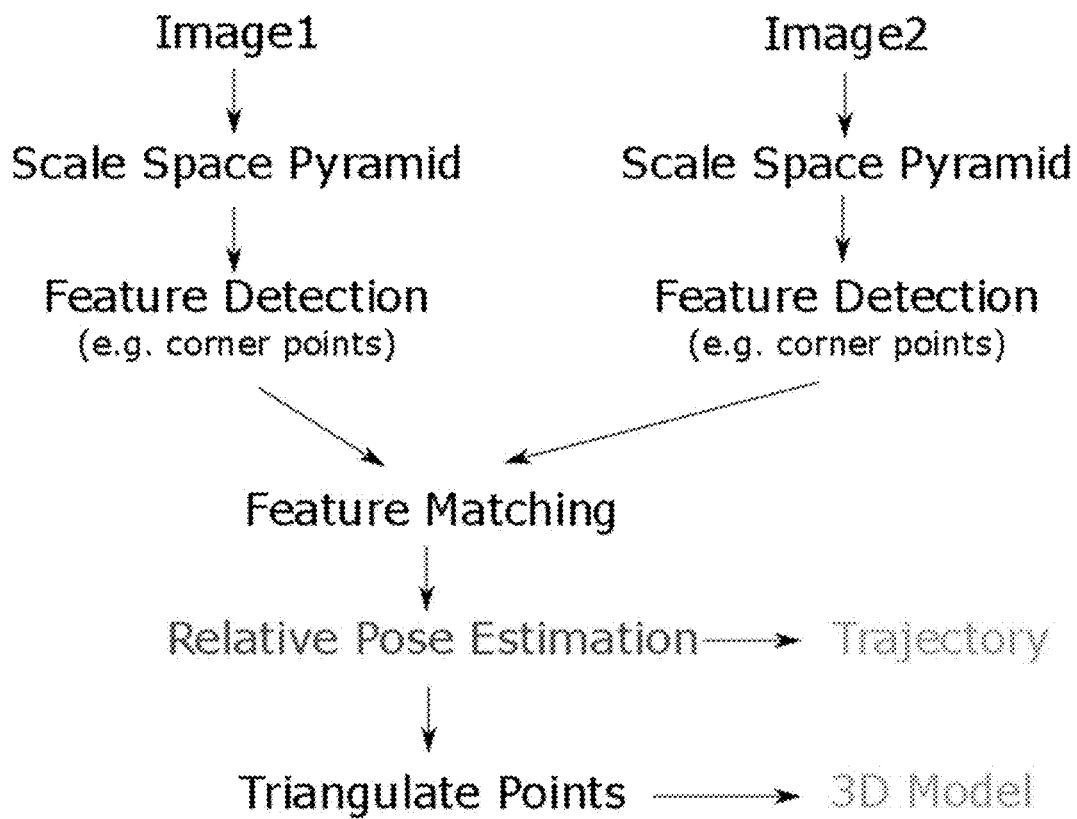
FIG. 1(b) is a basic flow chart showing the steps for determining a trajectory and for determining a 3D model.

FIG. 1(b) shows a flow diagram. Image 1 and image 2 are captured described above. As described above feature detectors are usually applied on scale space pyramids of the images. The features are extracted. Next, feature matching takes place.

As it described above, once the features have been matched, it is possible to estimate the relative pose of the camera. This allows the location of the car to be known, the trajectory of the car et cetera. This may also be used in odometry.

The above system can also be used for producing a 3-D model. Once the pose of the camera is known, then it is possible to build a 3-D model from the images captured by the camera using triangulation.

Figure 2:
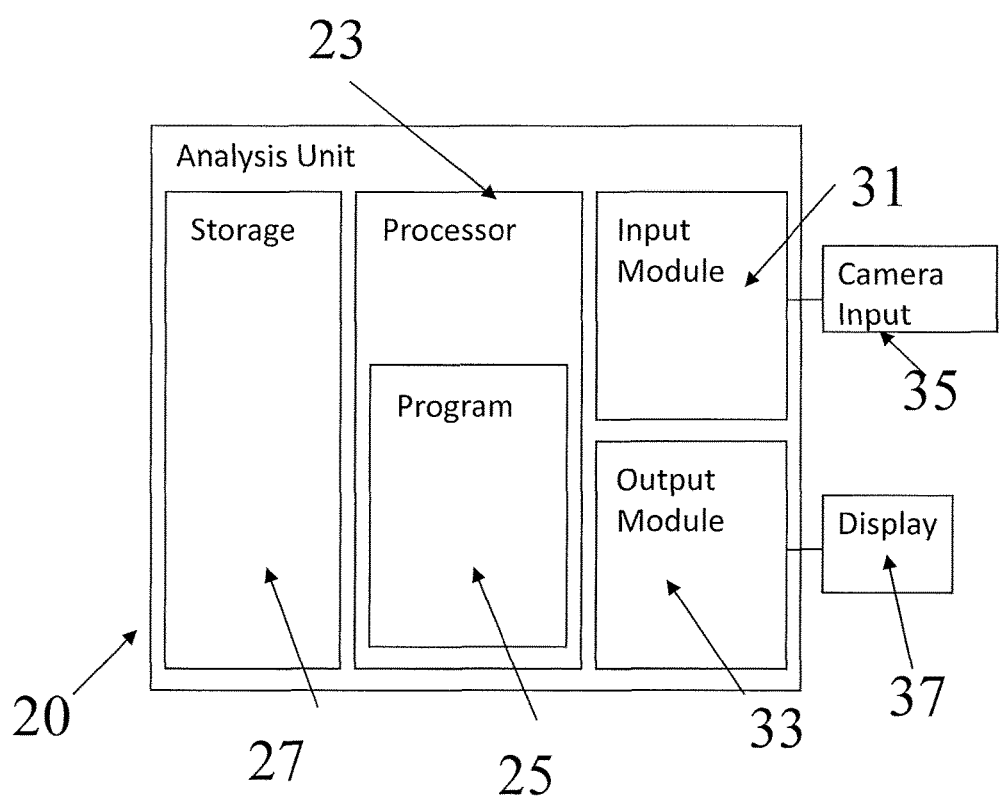
FIG. 2 is a schematic of an apparatus that can be used to perform a method in accordance with an embodiment.

FIG. 2 shows a possible basic architecture of a system analysis unit 20. The analysis unit 20 comprises a processor 23 which executes a program 25. Analysis unit 20 further comprises storage 27. The storage 27 stores data which is used by program 25 to analyse the data received from a camera.

The analysis unit 20 further comprises an input module 31 and an output module 33. The input module 31 is connected to a camera input 35. Camera input 35 receives camera data from the camera (not shown). The camera input 35 may simply receive data directly from the camera or alternatively, camera input 35 may receive camera data from an external storage medium or a network.

In an embodiment, connected to the output module 33 is a display 37. The display 37 may be used for displaying captured 3D images generated from the camera data received by the camera input 35. Instead of a display 37, the output module 33 may output to a file or over the internet etc.

Figure 3:
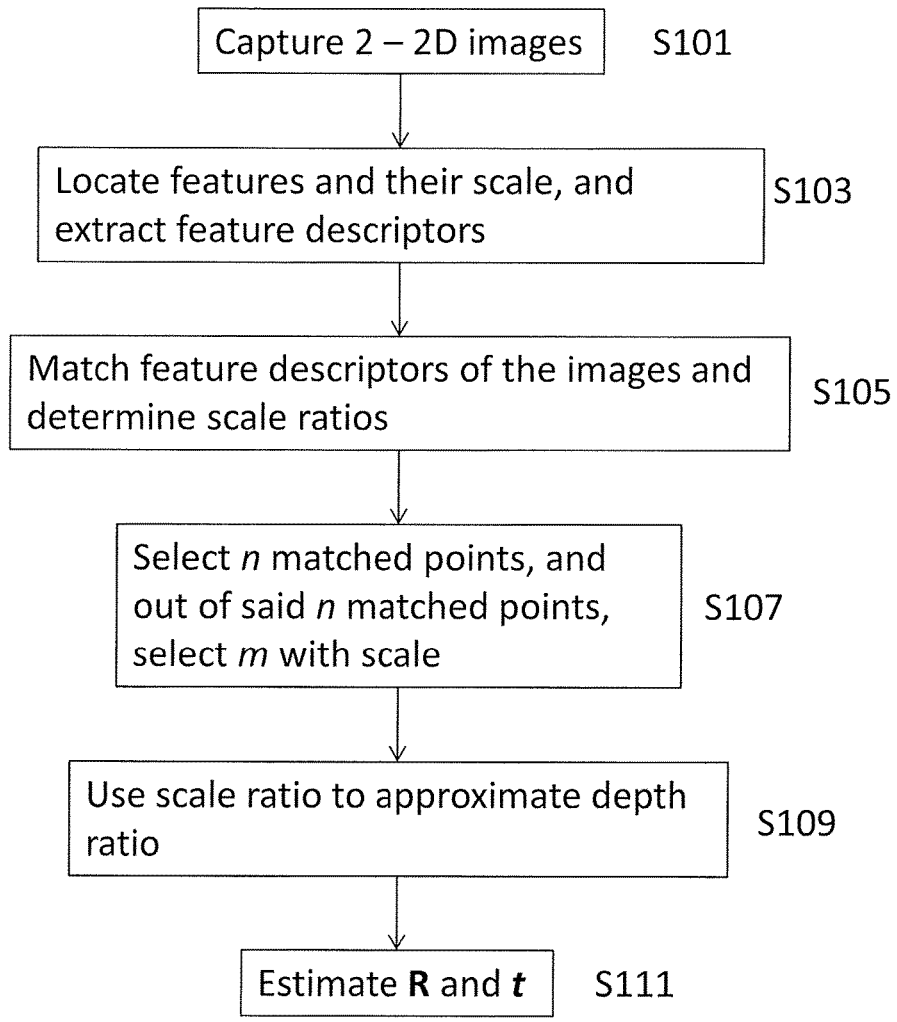
FIG. 3 is a flow chart showing a method in accordance with an embodiment.

FIG. 3 is a basic flow chart showing the steps of obtaining an estimate of the camera pose. In step S101, 2-D images are captured by a moving camera. An example of such images is shown in FIG. 4(a).

Next, in step S103, features are extracted from the 2 images. Looking at the two pictures of FIG. 4(a), the upper left hand window is used an example of extracting a feature.

Known algorithms can be used for extracting the features. Any feature extraction algorithm can be used providing that the extracted feature includes scale. Typically, feature extractors will identify the corners or other significant features of structure.

Next, in step S105, features are matched. N matched points in two views are denoted by homogenous vectors $x_i=[x_i \ y_i \ 1]^T$ and $x'_i=[x'_i; y'_i 1]^T$ respectively. Their corresponding 3D points in each frame's 3D coordinate system is found by $d_i x_i$ or $d'_i x'_i$, where $d_i$ and $d'_i$ denote the depth of points as observed from the relevant view.

If the relative pose between images is expressed by rotation $R \in SO(3) \subset \mathbb{R}^{3\times3}$ and translation $t \in \mathbb{R}^3$, then without loss of generality, it can be assumed that the intrinsic calibration matrix K is the identity.

Thus, the epipolar constraint is given by $$(x'_i)^T E x_i = 0, \text{ with essential matrix } E=[t]_x R, \quad (1)$$

where the cross-product between t and any vector $a \in \mathbb{R}^3$ is expressed by $[t]_x a = t \times a$. As noted above, the descriptor also extracts scale. The ratio $$s_i = \frac{d_i}{d'_i}$$

between depths $d_i$ and $d'_i$ of correspondence $(x_i, x'_i)$ from two views, it can be observed that the direction of the translation $$\frac{t}{|t|}$$

is determined by rotation R, as $$t = d'x' - dRx \Leftrightarrow t = d'(x' - sRx) \Rightarrow t \propto x' - sRx. \quad (2)$$

The above are shown pictorally in FIGS. 4(b) to 4(d).

Therefore, with one known correspondence (x, x', s), it is possible to rewrite (1) as $$(x'_i)^T (t \times Rx_i) = (x'_i)^T ((x'-sRx) \times Rx_i) = (x_i' \times x')^T Rx_i - (x'_i)^T R (sx \times x_i) = 0. \quad (3)$$

using equalities $a^T b = b^T a$, $a^T(b \times c) = b^T(c \times a)$ and $R(a \times b) = Ra \times Rb$ for a, b, c $\in \mathbb{R}^3$ Notice, rewriting (3) as the equality $(x'-sRx)^T(Rx_i \times x'_i)=0$ reveals the intuition behind: all epipolar planes must contain the translation t or equivalently the vector (x'-sRx). Furthermore, (3) entails that all correspondences with depth ratios $(x_i, x'_i, s_i)$ satisfy $$t \times (x'_i - s_i R x_i) = 0 \Leftrightarrow t \times x'_i - t \times s_i R x_i = 0 \Leftrightarrow t \times x'_i = s_i t \times R x_i, \quad (4)$$

where $a \times b = 0 \Leftrightarrow a \propto b$ for a, b $\in \mathbb{R}^3$. Thus, (4) not only enforces the epipolar constraint though (3), it also ensures the sine rule of triangles holds. Equations (3) and (4) above are employed to propose minimal solvers as described below.

The above mentioned descriptors, such as SIFT. ORB rely on so-called scale-space pyramid matching. Specifically, these methods intrinsically provide the scale difference between matched features in addition to the location information. In step S109, the scale information will be extracted in order to derive depth information.

The known scale ratio on the image plane is closely linked to the depth ratio. In fact, the scale ratio is reciprocal to the depth ratio in homogeneous coordinate space:

$$\begin{bmatrix} \frac{x}{s} \\ \frac{y}{s} \\ 1 \end{bmatrix} \doteq \begin{bmatrix} x \\ y \\ s \end{bmatrix} \quad (5)$$

This ratio between scales, or equivalently depth values can be denoted as $$s_i = \frac{d_i}{d_i'}$$

in the following.

There are exactly two minimal sets which solve the relative pose problem under consideration of scale. In total there are 5 unknowns representing the transition between cameras, 3 for rotation and 3 for translation (minus 1 as scale is irrecoverable).

The 2D location of matching pixels provides one epipolar constraint. If scale is additionally provided, the sine rule in equation 4 above must also hold. Henceforth there are two possible minimal solvers: (a) One point with scale and three points without (1×2+3×1=5), and (b) two points with scale and one point without (2×2+1×1=5).

First, looking at the 3+1 point algorithm. In step S107, four (n) matched points are selected in the two image views, one of these (m) with scale and location ($x_1$, $x_1'$, $s_1$) and three with location alone ($x_i$, $x_1'$), i=2, ..., 4. From these, rotation R and translation t are derived. Using equations (2) and (4) above, it is possible to express the following system of equations $$x_1' - s_1 R x_1 = t \qquad (6)$$

$$(x_i' \times x_1')^T R x_i = (x_i')^T R (s_1 x_1 \times x_i) = 0, i=2,3,4. \qquad (7)$$

It can be seen that equation (7) above is independent of t, and hence forms a system of 3 equations with 3 unknowns for rotation. This is then used as the core of the first minimal solver that will be called the 1+3 point algorithm. Translation t is then found through equation (2) above, as length of t is irrecoverable.

The rotation is expressed as quaternion $q = q_a + q_b i + q_c j + q_d k$, where $$R = 2 \begin{bmatrix} 0.5 - q_c q_c - q_d q_d & q_b q_c - q_d q_a & q_b q_d + q_c q_a \\ q_b q_c + q_d q_a & 0.5 - q_b q_b - q_d q_d & q_c q_d - q_b q_a \\ q_b q_d - q_c q_a & q_c q_d + q_b q_a & 0.5 - q_b q_b - q_c q_c \end{bmatrix}. \qquad (8)$$

Equation (7) can then be expanded under consideration of equation (8).

$$\begin{aligned}
0 = & (x_i(y_i' - y_1') - s_1 x_i'(y_1 - y_i))(1 - 2q_c q_c - 2q_d q_d) + \\
& (x_i(x_1' - x_i') - s_1 y_i'(y_1 - y_i))(2q_b q_c + 2q_d q_a) + \\
& (x_i(x_i' y_1' - y_i' x_1') - s_1(y_1 y_i))(2q_b q_d - 2q_c q_a) + \\
& (y_i(y_i' - y_1') - s_1 x_i'(x_i - x_1))(2q_b q_c - 2q_d q_a) + \\
& (y_i(x_1' - x_i') - s_1 y_i'(x_i - x_1))(1 - 2q_b q_b - 2q_d q_d) + \\
& (y_i(x_i' y_1' - y_i' x_1') - s_1(x_i - x_1))(2q_c q_d + 2q_b q_a) + \\
& ((y_i' - y_1') - s_1 x_i'(x_1 y_i - y_1 x_i))(2q_b q_d + 2q_c q_a) + \\
& ((x_1' - x_i') - s_1 y_i'(x_1 y_i - y_1 x_i))(2q_c q_d - 2q_b q_a) + \\
& ((x_i' y_1' - y_i' x_1') - s_1(x_1 y_i - y_1 x_i))(1 - 2q_b q_b - 2q_c q_c) = \\
& a_1^i(1 - 2q_c q_c - 2q_d q_d) + a_2^i(2q_b q_c + 2q_d q_a) + a_3^i(2q_b q_d - 2q_c q_a) + \\
& a_4^i(2q_b q_c - 2q_d q_a) + a_5^i(1 - 2q_b q_b - 2q_d q_d) +
\end{aligned} \qquad (8a)$$

-continued
$$a_6^i(2q_c q_d + 2q_b q_a) + a_7^i(2q_b q_d + 2q_c q_a) +$$
$$a_8^i(2q_c q_d - 2q_b q_a) + a_9^i(1 - 2q_b q_b - 2q_c q_c).$$

As q is unit length, it is possible to substitute $1 = q_a^2 + q_b^2 + q_c^2 + q_d^2$, and rearrange the right term of (8a) to be:

$$\begin{bmatrix} q_a \\ q_b \\ q_c \\ q_d \end{bmatrix}^T \begin{bmatrix} (a_1^i + a_5^i + a_9^i) & (a_6^i - a_8^i) & (a_7^i - a_3^i) & (a_2^i - a_4^i) \\ (a_6^i - a_8^i) & (a_1^i - a_5^i - a_9^i) & (a_2^i + a_4^i) & (a_3^i + a_7^i) \\ (a_7^i - a_3^i) & (a_2^i + a_4^i) & (a_5^i - a_1^i - a_9^i) & (a_6^i + a_8^i) \\ (a_2^i - a_4^i) & (a_3^i + a_7^i) & (a_6^i + a_8^i) & (a_9^i - a_1^i - a_5^i) \end{bmatrix} \begin{bmatrix} q_a \\ q_b \\ q_c \\ q_d \end{bmatrix} \qquad (8b)$$

Finally, the number of unknowns can be reduced by scaling q by $$\frac{1}{q_a}$$

and form the quadratic:

$$0 = \begin{bmatrix} \frac{q_b}{q_a} \\ \frac{q_c}{q_a} \\ \frac{q_d}{q_a} \end{bmatrix}^T \begin{bmatrix} (a_1^i - a_5^i - a_9^i) & (a_2^i + a_4^i) & (a_3^i + a_7^i) \\ (a_2^i + a_4^i) & (a_5^i - a_1^i - a_9^i) & (a_6^i + a_8^i) \\ (a_3^i + a_7^i) & (a_6^i + a_8^i) & (a_9^i - a_1^i - a_5^i) \end{bmatrix} \begin{bmatrix} \frac{q_b}{q_a} \\ \frac{q_c}{q_a} \\ \frac{q_d}{q_a} \end{bmatrix} + \qquad (8c)$$

$$2 \begin{bmatrix} (a_6^i - a_8^i) \\ (a_7^i - a_3^i) \\ (a_2^i - a_4^i) \end{bmatrix}^T \begin{bmatrix} \frac{q_b}{q_a} \\ \frac{q_c}{q_a} \\ \frac{q_d}{q_a} \end{bmatrix} + (a_1^i + a_5^i + a_9^i).$$

There is a degenerate case of $q_a=0$ related to rotations of 180 degrees. However, this is seldom observed in real data. Furthermore, since qa>0 is enforced, there is only one solution for each rotation matrix R. it, should be noted that q and −q cover the same rotation. Thus, equation (7) above can now be expressed in simple quadratic form of 3 equations.

$$r^T A_i r + b_i = 0, i=2,3,4, \qquad (9)$$

where the vector of unknowns corresponds to $$r = \begin{bmatrix} \frac{q_b}{q_a} & \frac{q_c}{q_a} & \frac{q_d}{q_a} \end{bmatrix}^T,$$

and $A_i$, $b_i$ and $c_i$ are known observations. With rotation as homogenous quaternion, a minimal solver can be derived through the Gröbner basis algorithm. The above described method resolves into an 8 degree univariate polynomial with 8 solutions. Its roots can be found efficiently through Sturm sequencing or more reliably through eigenvalue decomposition. Finally although equation (3) suffices as minimal solution, its nave application to leads to a 60% increase in trace and monomials. Consequently, the modified set of equations produces a numerically stable solver, as fewer computational steps are necessary to find an estimate of R and t in step S111.

As an alternative to the 3+1 solver described above, it is also possible use a 2+1 solver. Here, in step S107, n=3 and m=2. Thus, there are three point correspondences of which two have known scale i.e. $(x_1, x_1', s_1)$, $(x_2, x_2', s_2)$, and $(x_3, x_3')$. Using equations (2), (3) and (4) above, the following system of equations are derived:

$$x_1' - s_1 R x_1 = t \quad (10)$$

$$(x_1' - s_1 R x_1) \times (x_2' - s_2 R x_2) = 0 \quad (11)$$

$$(x_3' \times x_1')^T R x_3 - (x_3')^T R(s_1 x_1 \times x_3) = 0, \quad (12)$$

where equation (11) combines equation (4) with the proportional translation equivalence in equation (2). Similar to the above described, 1+3 point algorithm, a system to solve for rotation R alone is given by (11) and (12), which consists of three independent equations. Equation (11) is first simplified by first rearranging it into $$x_1' \times x_2' - s_1 R x_1 \times x_2' - s_2 x_1' \times R x_2 + s_1 s_2 R(x_1 \times x_2) = 0 \quad (13)$$

and then constructing a set of three equivalent quadratic equations, analogous to equation (9). When solving with Gröbner basis, it is possible to obtain a 4 degree univariate polynomial with 4 solutions. Again the roots can be found through Sturm sequencing or eigenvalue decomposition to give R. The translation t can then be derived from R in step S111.

The above methods computes rotation R and translation t directly. Therefore, chirality is automatically enforced. However, the 1+3 and 2+1 point algorithm has degeneracies. If points lie on the same epipolar plane, the equations are not independent resulting in a degeneracy. Also, as rotation is expressed as homogeneous quaternion, camera motion with rotation angle 180° is unsupported. Both instances however are seldom experienced in real images.

The method explained with reference to the flow diagram of FIG. 3 results in an estimation of the pose of the camera and specifically R and t. However, as there may be errors in the detection and matching of features, in a further embodiment a method is provided where the estimates of R and t described with reference to FIG. 3 are refined. One of these methods is to use the RANSAC estimation framework.

RANSAC is a robust estimation framework which employs minimal solvers. In the case of relative pose estimation from point correspondences, for example where determining camera pose, minimal sets are randomly selected to find hypotheses which are then tested on the remaining data samples. In this example, first, the two class setup is considered, and then unstable scales are used to integrate the minimal solvers into the RANSAC framework.

The minimal solvers described above have two classes of sample points, specifically locations of point correspondences/matches with scale and without. Therefore, the classical stopping criterion of RANSAC is modified to reflect the two inlier types:

$$K = \frac{\log(1-p)}{\log(1-r_s r_l^3)} \text{ or } K = \frac{\log(1-p)}{\log(1-r_s^2 r_l)} \quad (14)$$

for the 1+3 and 2+1 point algorithm respectively. K is the number of iterations needed to guarantee an inlier set has been selected, up to a probability p, under the assumption that $r_l$ and $r_s$ represent the likelihood of selecting inliers for location and location with scale respectively. The rates are based on inlier tests. Commonly, the Sampson distance is employed for estimating the error of the epipolar constraint for testing locations:

$$\frac{(((x')^T K_2^{-T} E K_1^{-1} x)^2)}{(K_2^{-T} E K_1^{-1} x)_1^2 + (K_2^{-T} E K_1^{-1} x)_2^2 + (K_1^{-T} E^T K_2^{-1} x')_1^2 + (K_1^{-T} E^T K_2^{-1} x')_2^2} < \delta_l, \quad (15)$$

where $K_1$ and $K_2$ are calibration matrices of the first and second view respectively, $(a)^2_i$ computes the square of the $i^{th}$ element of vector a, and $\delta_l$ is a location inlier threshold. Now an inlier test can be established for scale. Using equation 4 and under the assumption that x and x' are on the epipolar plane, it is possible to write $$|t \times x'| = s|t \times Rx| \Leftrightarrow \frac{|t \times x'|}{|t \times Rx|} = s \quad (16)$$

$$\text{and inlier test } \left| \frac{|t \times x'|}{|t \times Rx|} \frac{1}{s} - 1 \right| < \delta_x$$

as the normal vector of the cross-product is shared. The final term in equation 16 stems from the observation that scale from the image domain may differ from the expected scale implied by R and t which will be denoted by $\hat{s}$ in the following. In particular, the scale error $\varepsilon_s$ is defined as the change required to match s with $\hat{s}$, such that the difference is given by. $\hat{s}=s(1+\varepsilon_S)$. Finally, it is possible to define as scale inliers the correspondences which satisfy the location constraint in equation 15 as well as the scale test in equation 16 up to small errors $\delta_l$ and $\delta_S$. It should be noted, that the magnitude of threshold $\delta_S$ can be easily established and the consideration of parameters related to the step-size in the scale-space pyramid.

In high resolution images, feature detectors are fairly reliable for locations. Unfortunately, the estimation of scale is less stable and depends on the step-size used in the scale-space pyramid. For example, in SIFT scales are initially discretized by $s_i \in \{\sigma_0 2^{l \sigma_s} | l=0, 1, 2, 3, \ldots\}$ with base scale $\sigma_0=1.6$ and step-size $\sigma_s=1$, and then interpolated to continuous values. Consequently, errors are inadvertently introduced which can affect the solvers.

An efficient bisection search is proposed which is aimed at correcting errors in scale. In particular, the relative pose problem is solved iteratively with multiple scales taken around the original observation. Starting with solutions for $s_i$, $s_i(1+\varepsilon)$ and $s_i(1-\varepsilon)$, the scale with the best choice for $s_i$ is updated, half the variance $$\varepsilon \leftarrow \frac{\varepsilon}{2},$$

and continue the process. It should be emphasized that, a monotonously reducing performance measure with reducing error is required for bisections to work. The location inlier ratio is employed as a performance measure.

Finally it should be noted that as the bisection search is employed, more solutions are required to be computed for the relative pose problem. The scoring of the varied scales is computationally the most significant cost, as in contrast our solvers are fast. Hence, preemptive methods, and early bailout for enhanced runtime performance are performed.

Figure 5:
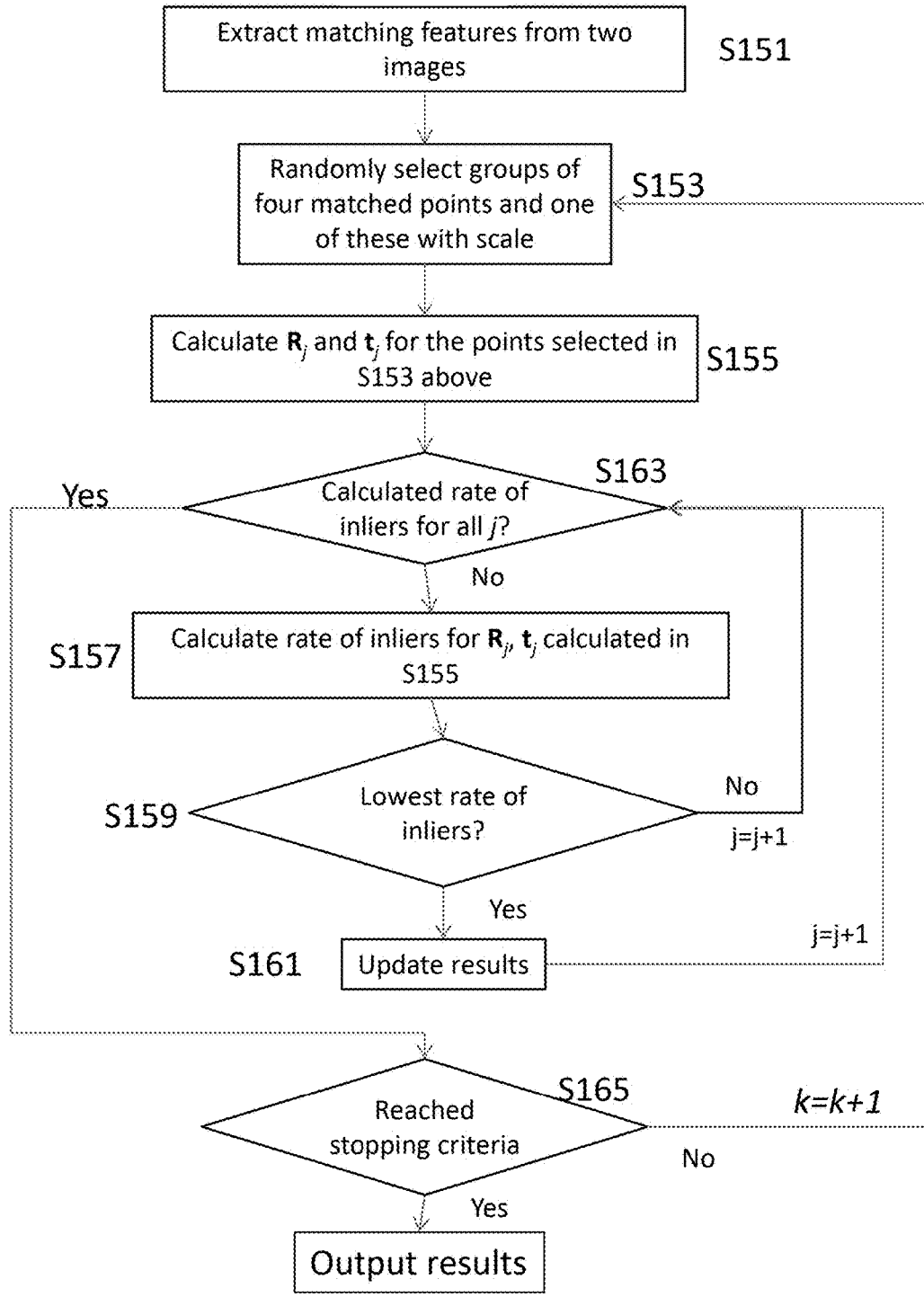
FIG. 5 is a flow chart showing a method in accordance with an embodiment where the RANSAC framework is employed.

FIG. 5 shows a flow diagram of the RANSAC method using the solutions from FIG. 3 as minimal solvers.

Also, pseudo code is listed below for the 1+3 point algorithm. Where the 2+1 algorithm differs, the pseudo-code has been put in { }:

of FIG. 5 looks at a simplified solution from that of the above pseudo code, in the flow diagram of FIG. 5, there is no correction for scale. A correction for scale will be described with reference to the flow diagram of FIG. 6.

In step S163 a loop is started where the algorithm checks to see if the rate of inliers has been calculated for all j.

If it has not, the rate of inliers is calculated for $R_j$ and $t_j$ calculated in step S155. The rate of inliers in terms of location $r_l$ and the rate of inliers in terms of scale $r_s$ are calculated using equations 15 and 16 as described above.

The overall rate of inliers, r, is calculated from $r_s r_l^3$ for the 1+3 algorithm. If this is the lowest rate calculated, then this is set as the best result $\hat{r}$. Also, $\hat{R}=R_j$, $\hat{t}=t_1$ and

---

Input: N point correspondences $(x_i, x_i', s_i)$ calibration matrices $K_1$ and $K_2$, desired probability of inlier set selection p.
Output: Estimated rotation R and translation t between views.
1: Initialize best rate $\hat{r} \leftarrow 0$, pose $\hat{R} = I$, $\hat{t} = [0\ 0\ 0]^T$, and count $k \leftarrow 0$
2: repeat
3:   1 + 3: Randomly select $(x_a, x_a', s_a)$, $(x_b, x_b')$ $(x_c, x_c')$ and $(x_d, x_d')$ from $(x_i, x_i', s_i)$
     {for the 2 + 1 point algorithm: Randomly select $(x_a, x_a', s_a)$, $(x_b, x_b', s_b)$ and $(x_c, x_c')$
     and from $(x_i, x_i', s_i)$}

4:   Initialize scale variation $\varepsilon \leftarrow \dfrac{\sigma_s}{100}$

5:   while $\varepsilon > 10^{-3}$ do
6:     1 + 3: Find $R_j$, $t_j$ for selected tuples with scales $s_a$, $s_a \pm \varepsilon$.
       {For the 2 + 1 algorithm: Find $R_j$, $t_j$ for selected tuples with scales $s_a$, $s_a \pm \varepsilon$, $s_b$, $s_b \pm \varepsilon$.}
7:     for all $R_j$, $t_j$ do
8:       1 + 3: Compute inlier rates $r_s$ and $r_l$ and set $r \leftarrow r_s r_l^3$
         {For the 2 + 1 algorithm: Compute inlier rates $r_s$ and $r_l$ and set $r \leftarrow r_s^2 r_l$
         }
9:       if $r > \hat{r}$ then
10:        Update best results $\hat{r} = r$, $\hat{R} = R_j$, $\hat{t} = t_j$ and find K =

$\dfrac{\log(1-p)}{\log(1-r)}$

11:      end if
12:    end for
13:    if Maximum projected improvement less than $\hat{r}$ then
14:      break;
15:    end if 16:    1 + 3: Select best scale and update $s_a$ and $\varepsilon \leftarrow \dfrac{\varepsilon}{2}$ {For the 2 + 1 algorithm: Select best scales and update $s_a$, $s_b$ and $\varepsilon \leftarrow \dfrac{\varepsilon}{2}$ 17:    end while
18:    k = k + 1
19: until $k \geq K$

---

In step S151, matching features are extracted from two images. To simplify matters, it will be assumed that the 1+3 point algorithm is used here. Variations to the method to adapt to the 2+1 point algorithm will be described later.

Next in step S153, for the 1+3 point algorithm, a group of 4 matched points are randomly selected as shown in line 3 of the above pseudo code. Following that, R and then t are calculated in step S155 for the randomly selected tuple. R and t are calculated as described in relation to FIG. 3. There will be multiple solutions for the set of randomly chosen tuples (a maximum of 4 or 8 solutions). An index j is used to indicate the indexing of the solutions. The flow diagram $$K = \frac{\log(1-p)}{\log(1-r)}$$

are set in step S161. Next, J is incremented and the loop returns to step S163 and then the rate of inliers is calculated for the next solution for the same group of couples in step S157.

If in step S159, the lowest rate of inliers is not calculated for the current j, then the method looks back to step S163, incrementing the counter j but without updating the results.

This loop continues until the inlier rate has been calculated for all j i.e. all solutions for the currently selected tuple.

Once the inlier rate has been calculated for all j, the method proceeds to step S165 where it is determined whether stopping criteria has been reached. The stopping criteria explained with reference to equation 14. If the stopping criteria has not been reached, the index case is incremented by one to indicate that a new group of 4 matched points should be selected at step S153. Then, the method proceeds as described above.

Once the stopping criteria has been reached, the results are output. The results give the pose of the camera. This can be a simple output of the camera position. The output may also then be used as part of a SLAM system or other system where the position and/or pose of a moving object needs to be determined.

As explained above, feature detectors are reliable for locations. However, the estimation of scale is less stable and depends on the step size used in the scale-space pyramid. The flowchart of FIG. 6 takes this into account.

Figure 6:
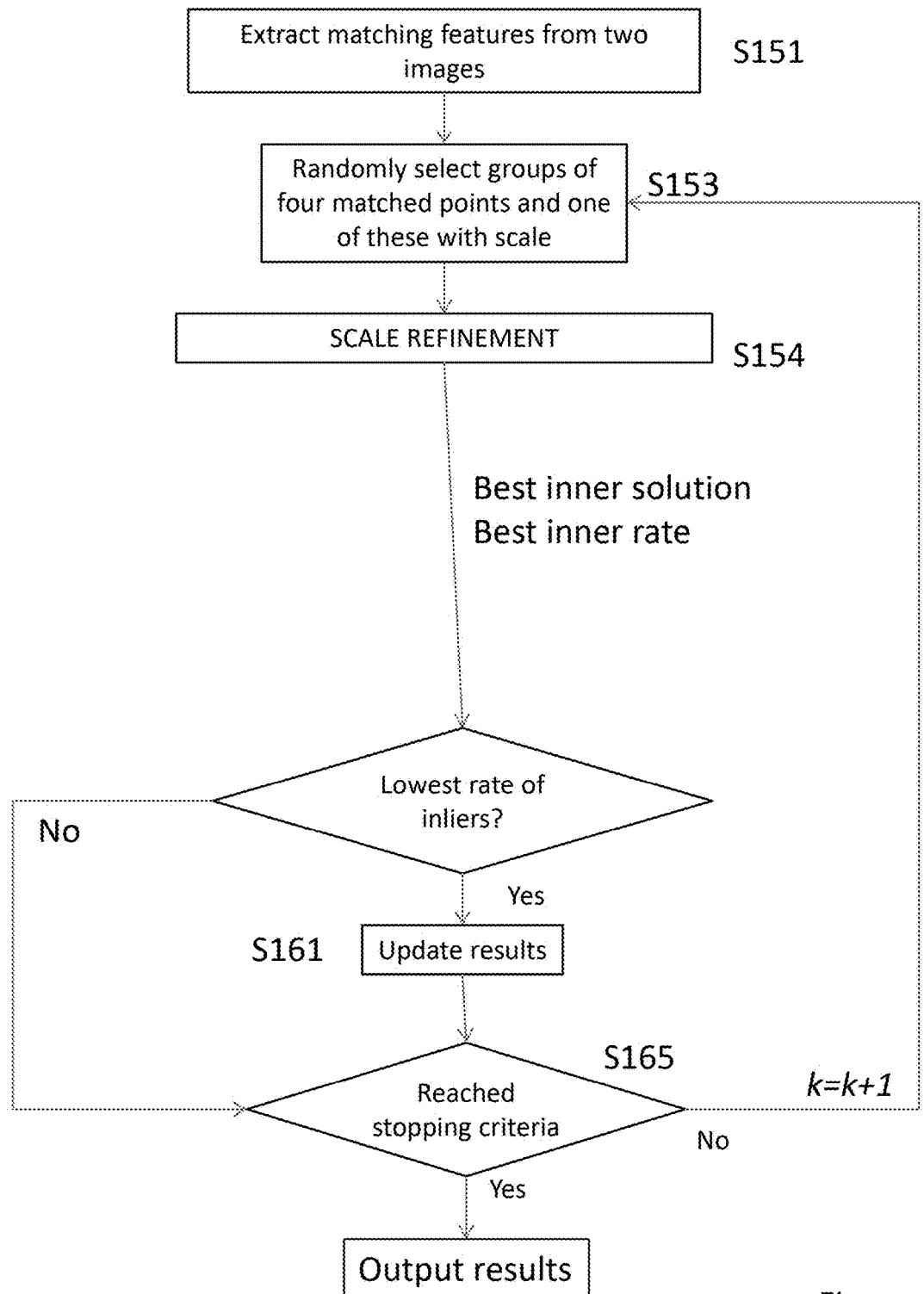
FIG. 6 is a flowchart showing a variation on the flowchart of FIG. 5 where scale errors are corrected.

To avoid unnecessary repetition, like reference numerals will be used to denote like features. In FIG. 6, step S155 from FIG. 5 has been replaced with step S154. In step S155, $R_j$ and $t_j$ were calculated for the tuples selected in step S153. This also happens in step S154. However, these values are calculated for the measured scale but also the scale with an error, expressed as $s_a$, $s_a \pm \varepsilon$. This is done for the reasons described above in that the measured scale in the descriptor will usually be a value selected from a number of stepped values. However, in reality, the scale may fall between 2 of these steps. Therefore, this process takes place where an error is applied to the scale and the model is run the scale incorporating this error. If the scale incorporating this error gives a better result, then the scale with the error is used in the next iteration. In each iteration, the possible error is reduced to allow the method to home in on the most appropriate scale.

Figure 7:
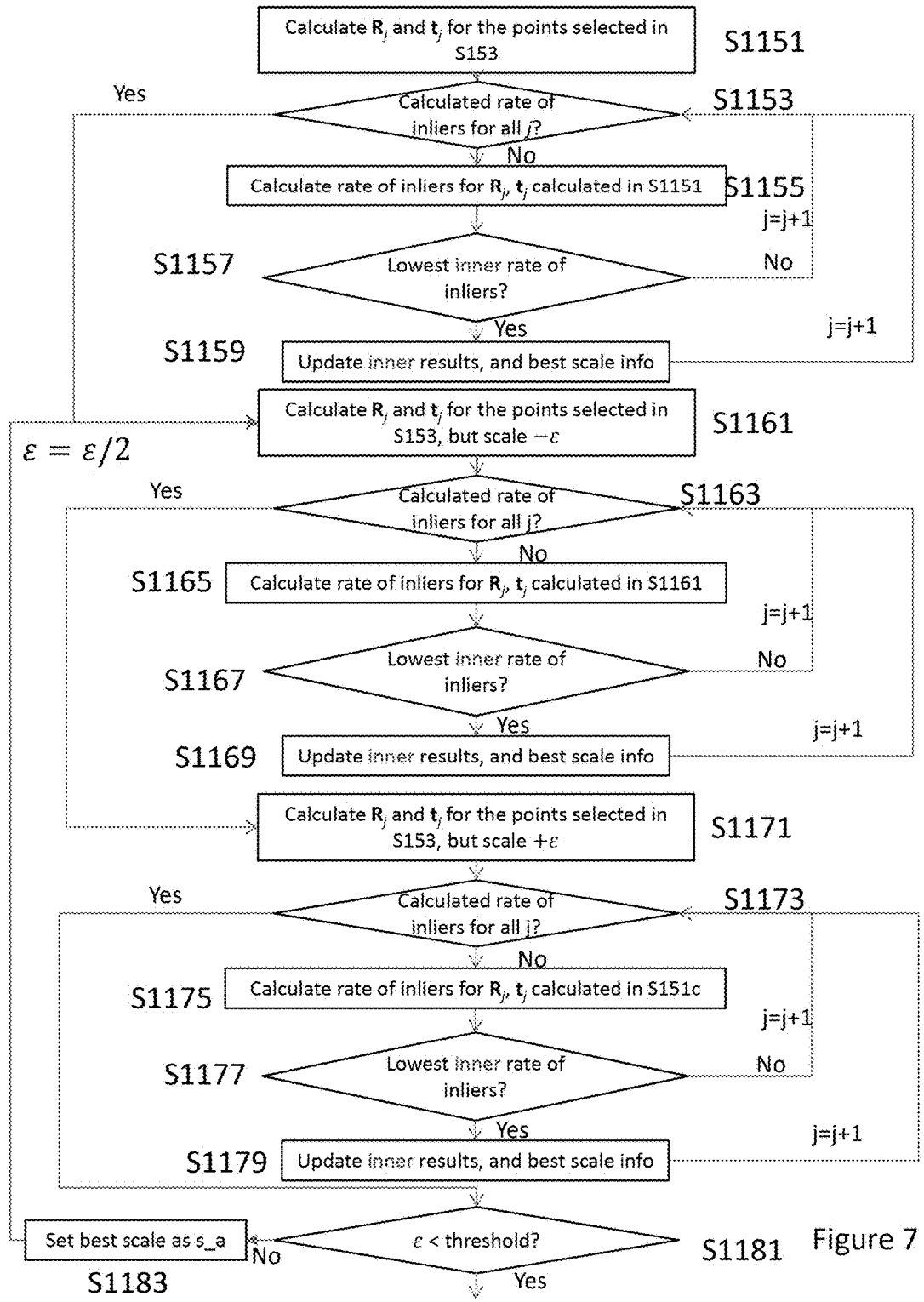
FIG. 7 is a flowchart showing the process of correcting scale errors in more detail.
Figure 11A:
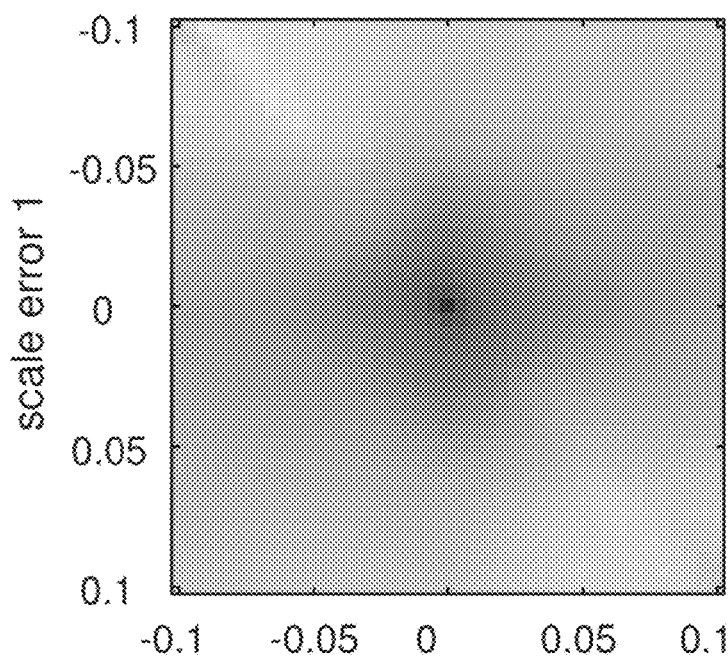
FIG. 11(a) shows, for the 2+1 algorithm, the scale effect on error in the essential matrix for the two scale ratios.
Figure 11A:
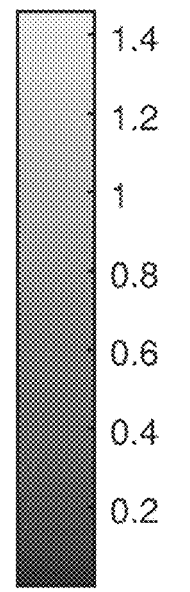
Figure 11B:
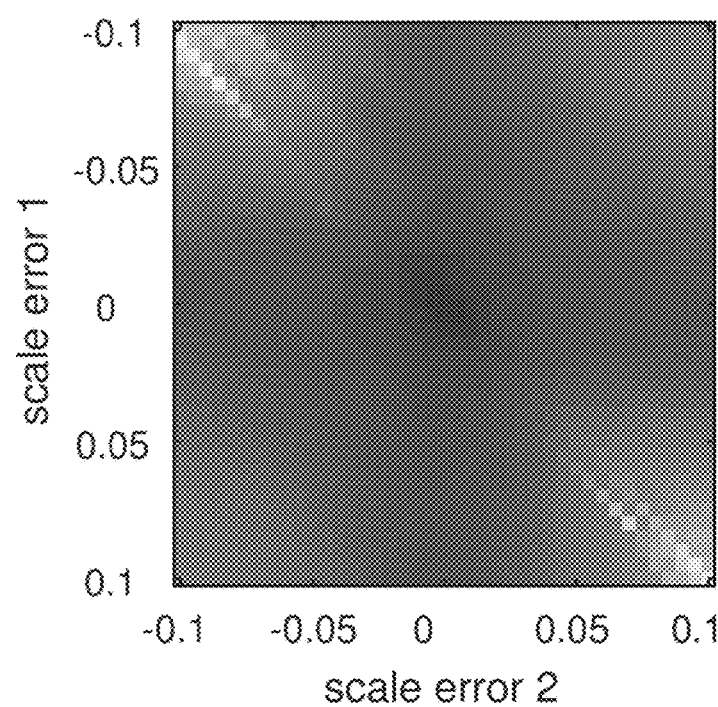
FIG. 11(b) shows, for the 2+1 algorithm, the scale effect on the mean error on epipolar constraint for the two scale ratios.
Figure 11B:
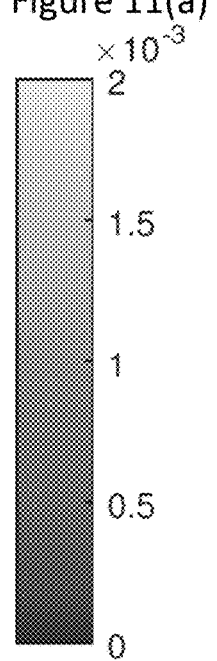
Figure 11C:
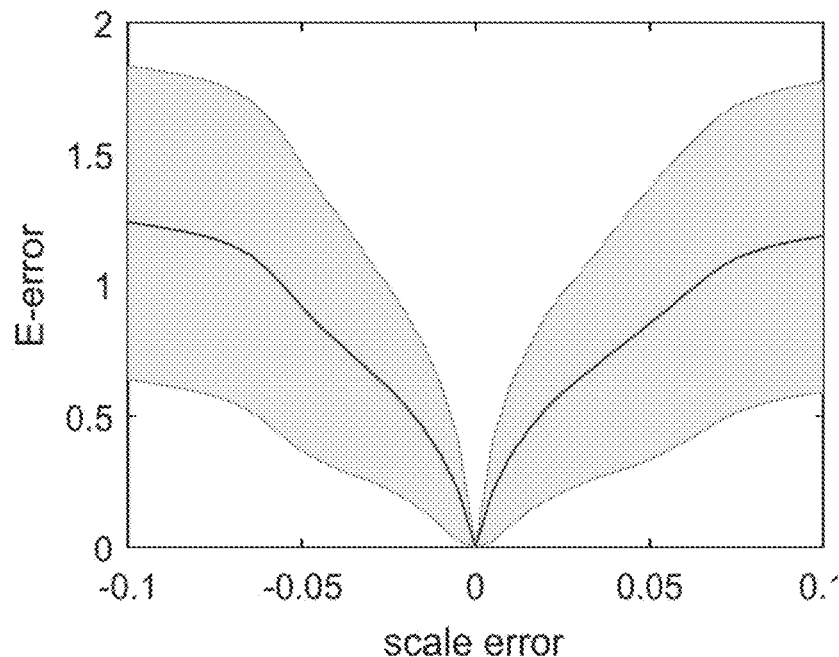
FIG. 11(c) shows the centre slice of the data of FIG. 11(a)
Figure 11D:
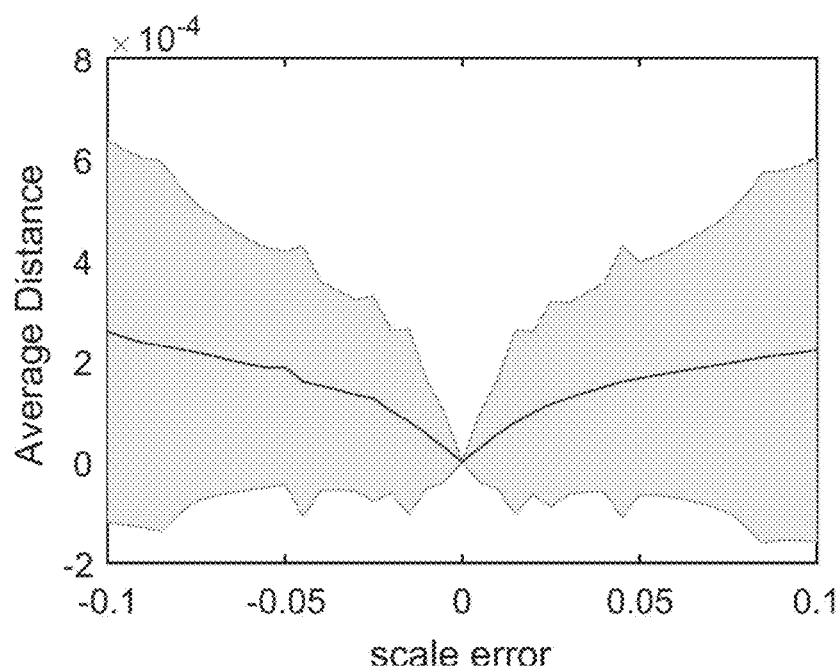
FIG. 11(d) shows the centre slice of the data of FIG. 11(b)
Figure 11E:
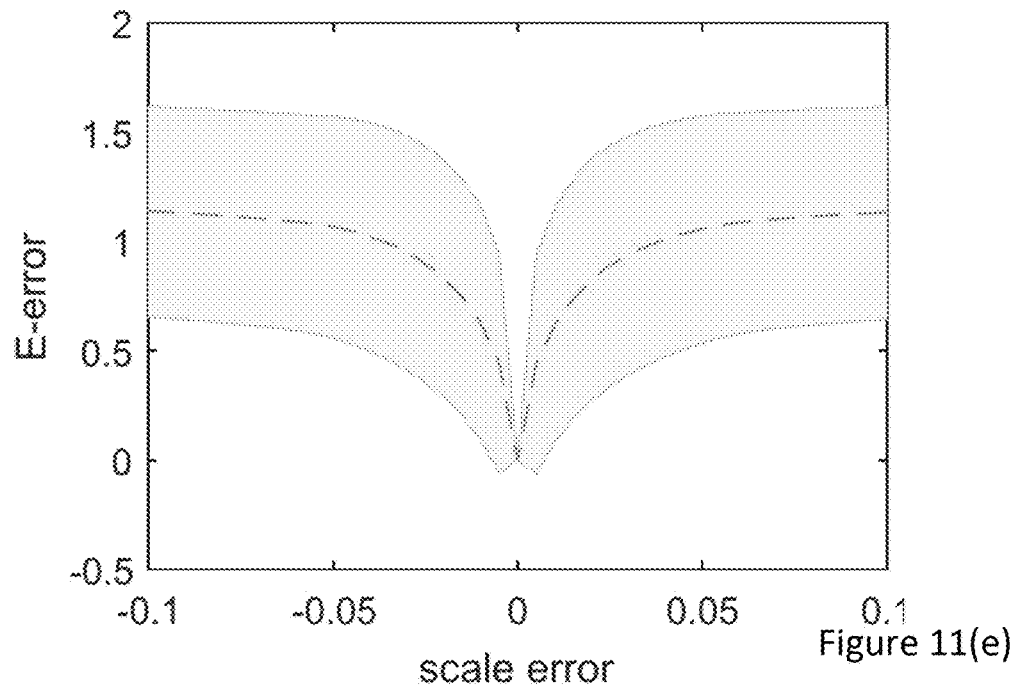
FIG. 11(e) shows, for the 1+3 algorithm, the scale effect on error in the essential matrix for the scale ratio.
Figure 11F:
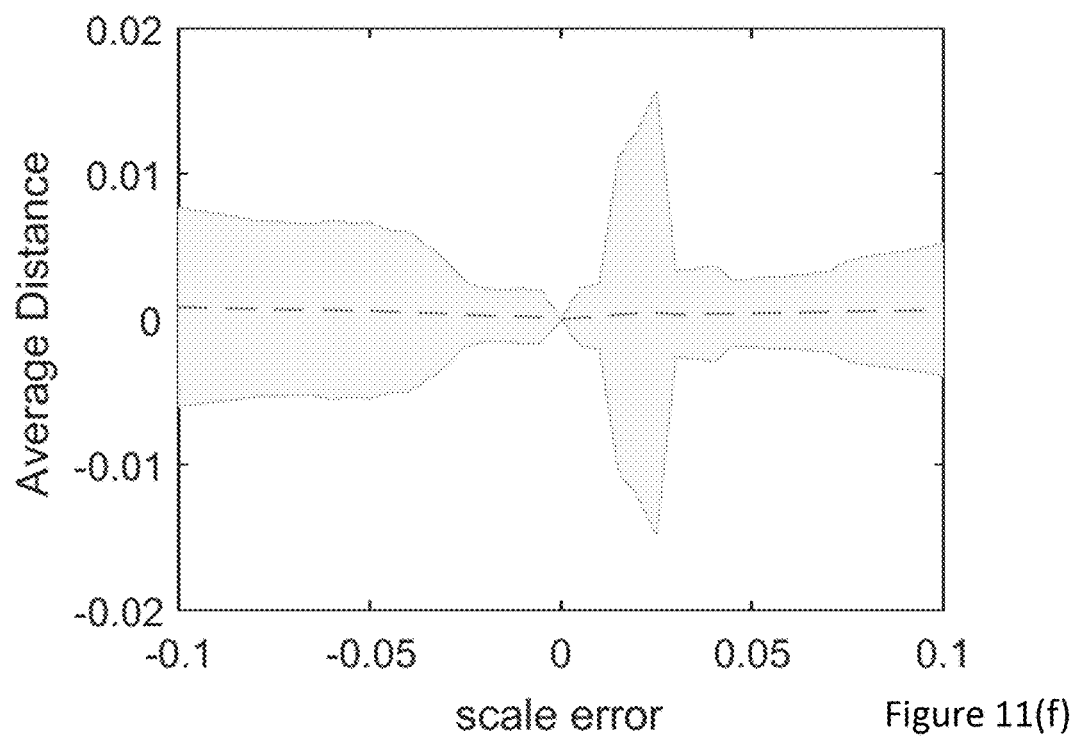
FIG. 11(f) shows, for the 1+3 algorithm, the scale effect on the mean error on epipolar constraint for the scale ratio.

FIG. 7 shows the scale refinement step S154 in more detail. In step S1151. R and then t are calculated for the randomly selected tuple. It is then checked in step S1153 to see if the loop is finished and if the rate of inliers has been calculated for all j. If it is not, then the rate of inliers is calculated for j in step S1155. It is then checked in step S1157 to see if this is the lowest rate of inliers. If it is not, then the index/increments and the loop returns the step S1153. If a new lowest rate of inliers has been calculated, the results are updated in step S1159 and j is incremented in the loop returns to step S1153.

In step S1153, if the loop is finished and the inliers for all j have been calculated, then the method most step S1161. Here, an error $\varepsilon$ is subtracted from the scale. A process similar to that described above is then executed. The index j is reset. First, in step S1163, there is a check to see if the loop should be finished. Next, in step S1165, the rate of inliers is calculated. In the same manner as above, in step S1167, if the newest rate of inliers is lower than the previously saved rate of inliers, then the results are updated in step S1169 and the index is incremented in order to loop back to S1163. If the most recently calculated inlier rate is not the lowest, then the results are not updated and the system again loops back to step S1163.

If at step 1163, it is determined that all solutions been examined, then the method proceeds to step S1171 where the index is reset and the error $\varepsilon$ is added to the scale. A process similar to that described above is then executed. First, in step S1173, there is a check to see if the loop should be finished. Next, in step S1175, the rate of inliers is calculated. In the same manner as above, in step S1177, if the newest rate of inliers is lower than the previously saved rate of inliers, then the results are updated in step S1179 and the index is incremented in order to loop back to S1173. If the most recently calculated inlier rate is not the lowest, then the results are not updated and the system again loops back to step S1173.

If in step S1173, it is determined that all solutions have been tested, the method proceeds to step S1181. Here, it is checked to see if the error is below a threshold. If it is not, the best scale measurement is set as scale management $s_n$ in step S1183 and the error is halved. The process then loops back to step S1161, where steps S1161 to step S1181 are repeated with the halved error. The steps are continually repeated, with the error being reduced until the error falls below a threshold.

In an example, the following pseudo-code may be used:
1) Calculate solutions $\{R_j, t_j\}$ for s_a (set j=0)
2) $R_j$ and $t_j$ exists for current j?
   a. Yes: continue.
   b. No: go to 5.
3) Calculate inlier ratio.
4) Lowest current inlier rate?
   a. No: j+1 and go to 2
   b. Yes: Save $s_a$ as best scale so far (store rate, solution etc.) and do 4.a
5) Calculate $R_i$ and $t_j$ for $s_a$+e (set j=0)
6) $R_j$ and $t_j$ exists for current j?
   a. Yes: Continue.
   b. No: go to 9
7) Calculate inlier ratio.
8) Lowest current inlier rate?
   a. No: j+1 and go to 6
   b. Yes: Save s_a+e as best scale so far (store inlier rate, solution etc.) and do 8.a
9) Calculate $R_i$ and $t_j$ for $s_a$−e (set j=0)
10) $R_j$ and $t_j$ exists for current j?
    a. Yes: continue.
    b. No: go to 14
11) Calculate inlier ratio.
12) Lowest current inlier rate?
    a. No: j+1 and go to 10
    b. Yes: Save s_a-e as best scale so far (store rate, solution etc.) and do 12.a
13) Is e<threshold?
    a. No: Update s_a to be best scale, half e and loop from 5.
    b. Yes: Continue.
14) Lowest overall inlier rate?
    a. Yes: update results and stopping criterion from stored rate and solution.
    b. No: Continue
15) S165

The above has been described in relation to the 1+3 point algorithm. However, it can be easily adapted to the 2+1 point algorithm using the different selection of matched features where 2 are selected with scale and 1 without. Further, the calculation of R and t is as described above in relation to equations 10 to 13 as opposed to equations 6 to 9. Also, the stopping criteria is modified as per the second variation shown in equation 14.

It should be noted that in the 2+1 point algorithm, there are 2 scale ratios and both of these are varied by the error $\varepsilon$ and both are optimised as explained in relation to lines 3 and 16 of the first example of pseudocode above.

To demonstrate the results obtained from the above methods, a synthetic data model is used. To evaluate the methods with known noise, a two view setup is used as shown in FIG. 8. In FIG. 8, each camera 201, of the two cameras is chosen with focal length 1 and random motion with baseline 0.1 and rotation of at most 45°. Points are sampled with depth values between 1 and 1.5.

Additionally noise is introduced on location and depth ratio observations in the following. The evaluation is based on three error measures:

$$E\text{-error: } \min_i \left\| \frac{\hat{E}}{|\hat{E}|} - \frac{E_i}{|E_i|} \right\|_F \quad (17)$$

$$t\text{-error: } \min_i \arccos\left(\frac{\hat{t}^T t_i}{|\hat{t}||t_i|}\right) \quad (18)$$

$$R\text{-error: } \min_i \arccos\left(\frac{\text{trace}(\hat{R}^T R_i) - 1}{2}\right) \quad (19)$$

where i indexes the set of solutions. The Frobenius norm between the true essential matrix $\hat{E}$ and estimated essential matrices $E_i$ in equation (17) is used to test overall system performance. Angular errors between true translation vector $\hat{t}$ and estimations $t_i$ or true rotation matrix $\hat{R}$ and estimations $R_i$ in equations (18) and (19) are employed for a more detailed analysis.

FIGS. 9(a), (b) and (c) shows the obtained errors for the Essential Matrix, translation and rotation respectively with noise in location measurements. Normal distributed noise is induced to the points on the image planes, which are denoted as a standard deviation of pixel magnitude as observed by a CIF image (resolution 352px×240px). The 1+3 and 2+1 point algorithms (denoted 1+3 pt and 2+1 pt in the following) are compared to a five point algorithm (denoted 5 pt) which considers location alone. The E-error is modified to support ±$E_i$ for 5 pt. In total, 10,000 random instances of 3, 4 or 5 points are generated using the model.

Although 1+3 pt only requires four locations in total, it is most vulnerable to noise, yet comparable to 5 pt. 2+1 pt performs significantly better than both other approaches, as the essential matrix derived is supported by two accurate scale measurements.

Looking closer at 1+3 pt and 2+1 pt with noisy scale, FIGS. 10(a), (b) and (c) show the average performance for 10,000 instantiations of different noise-levels for the Essential Matrix, translation and rotation respectively (modelled as Gamma distribution around 1 with a variance of one $100^{th}$ of SIFT's default step-size).

Again, 2+1 pt out-performs the 1+3 pt setup, and rotations are especially improved. Notice, in equation (11) two scales must ensure that the rotation supports the translation, reducing the chance of incorrect results. In fact, it was found that for large errors in scale, 2+1 pt often produce few or even no real valued solution, which indicates some robustness to noise.

FIG. 11 shows the scale effect on E-error. FIG. 11(a) shows, for the 2+1 algorithm the scale effect on E-error for both scale ratios separately and FIG. 11(b) shows the mean error on epipolar constraint for 10,000 inliers. FIGS. 11(c) and 11(d) show centre slice of the data of FIGS. 11(a) and (b) respectively. FIGS. 11(e) and (f) show the corresponding data for the 1+3 point algorithm. Both methods increase virtually monotonically with increasing noise. The above data was taken from 10,000 trials.

FIG. 11 detail models noise in scale systematically with increasing error. It should be noted that both the 1+3 pt and 2+1 pt, are virtually monotonously increasing with larger noise levels. This behaviour is exploited in the bisection algorithm as described above. Although the true essential matrix is unknown in real data, an approximation of E-error is provided by estimating the inlier ratio, or alternatively the mean error in epipolar constraint.

Figure 12:
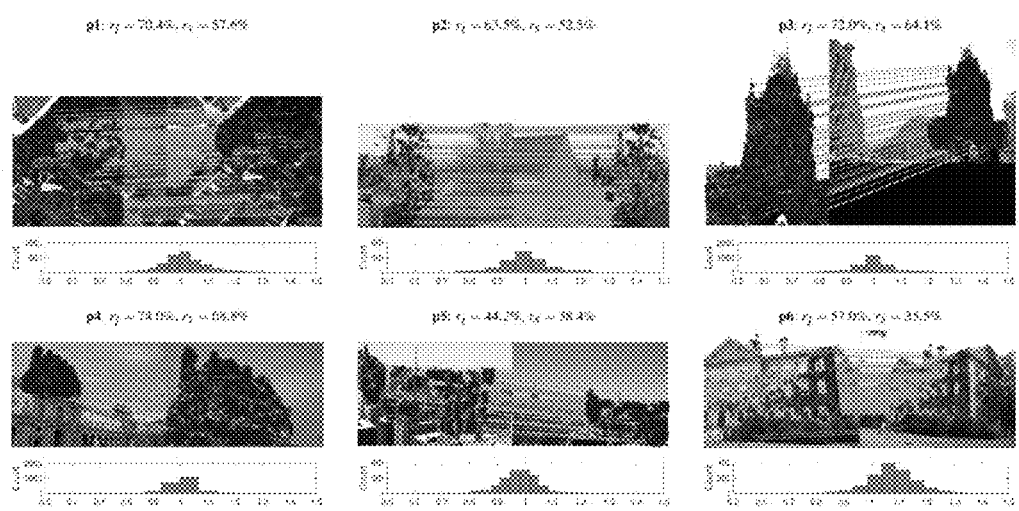
FIG. 12 shows 6 pairs of images with the ratio of scale inliers and location inliers shown, each pair of images is shown with an associated histogram of scale divergence.

The above methods are next tested on 6 real image pairs with varying degree of difficulty as shown in FIG. 12. First SIFT feature matches are extracted. Next RANSAC is performed (with =0.99, δ=1px, δ=0.1), and the evaluation is based on the location inlier criterion as described above. The comparison is between the proposed methods and the five point algorithm. As RANSAC is based on a random selection process, all algorithms are run 1,000 times and averages are reported.

Figure 13:
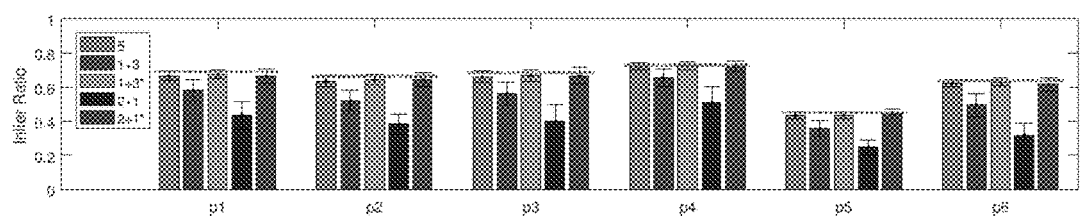
FIG. 13 is a histogram showing the location based inlier ratio for each of the pairs of images of FIG. 12.

The inlier ratio for 5 pt, 1+3 pt and 2+1 pt are compared in FIG. 13. The performance without scale correction is significantly reduced for 1+3 pt and 2+1 pt. fig:ransac additionally shows the results of 1+3 pt and 2+1 pt with bisection refinement (sec:bisection), denoted 1+3* and 2+1*.

Overall these perform similarly to 5 pt, with 2+1* reaching the highest inlier ratios in p2, p3, p4 and p5, and 1+3* having the best performance in p1 and p6. fig:images shows visual examples for 2+1*. Image pair p1 has limited scale change and relatively simple camera configuration. Images p2, p3, p4 and p5 benefit from scale as we obtain reduced location dependence. A challenging setting for scale exploitation is p6, as the projection reduces the area of the patches' ellipses consistently, resulting in incorrect scale ratios. This is also apparent in the divergence in scale, given by $$\frac{\hat{s}_i}{s_i}$$

with required scale $\hat{s}_i$ as estimated by 2+1*, which are normal distributions around 1 apart from results in p6.

Finally it is noted that overall 1+3* and 2+1* significantly improve on iterations needed by RANSAC, however, naïvely more solutions are explored for the bisection search. Early bailout and preemptive evaluation is therefore essential with less reliable scales.

Efficient minimal solvers are presented for the estimation of relative pose between two calibrated images. The proposed method exploits known scale ratios of feature matches which are intrinsically provided by scale invariant feature detectors with scale-space pyramids (SIFT). Since we are using scale, the number of required feature Two solutions for relative pose with known scale ratios are presented above. In particular notice, as descriptors such as SIFT employ a scale-space pyramid, the patches' scales on the image planes are inherently provided. The above described methods use the connection between scales and depth and derive geometric constrains linking pose and depth ratios. In total, there are two possible minimal sets for location and scale correspondences, the 1+3 point algorithm which takes 4 feature matches with 1 known scale, and the 2+1 point algorithm which estimates relative pose from 3 matches with 2 known scales.

The minimal solvers are then used in a final estimation framework using random sampling consensus (RANSAC). The above methods:
1. derive geometric observations relating scale (or depth) ratios to relative pose.
2. exploit scale-space feature detection and derive two new minimal solvers for pose.

3. embed the 1+3 and 2+1 point algorithm into RANSAC for unreliable scale.

In the above methods the reciprocal relation between scale and depth is used. In the above methods, two solvers are derived each related to one of the two possible minimal sets: The 1+3 point algorithm estimates relative pose from four feature matches with one known scale, while the 2+1 point algorithm computes relative pose from three feature matches with two known scales. The proposed methods are embedded into RANSAC with two inlier classes, and present an efficient RANSAC modification for less reliable scales.

The above method exploits known scale ratios of feature matches which are readily provided by scale invariant feature detectors with scale-space pyramids (e.g. SIFT, ORB features).

Since it uses scale, the number of required feature matches is reduced and consequently fewer inliers are needed. The 1+3 point algorithm estimates relative pose from four feature matches with one known scale, while the 2+1 point algorithm computes relative pose from three feature matches with two known scales.

Finally, the method is applicable to RANSAC with two inlier classes. An efficient RANSAC modification is presented to handle less reliable scales.

The above method utilizes solely image-to-image correspondences with 1 or 2 correspondences carrying additional scale-ratio information. Further, the above method solves for relative pose exactly.

In the above method, the 1+3 point algorithm requires only 4 inliers and produces up to 8 solutions, while the 2+1 point algorithm produces only up to 4 solutions. Therefore picking a reliable set of feature correspondences is relatively easy and little computation is required to filter correct solutions.

The above methods allow estimation of relative pose where no additional hardware is required, and any camera motion between views is feasible. The readily available scale is exploited to reduce the number of feature correspondences needed.

While certain embodiments have been described, these embodiments have been presented by way of example only, and are not intended to limit the scope of the inventions. Indeed the novel methods and apparatus described herein may be embodied in a variety of other faults; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A camera pose estimation method for determining the translation and rotation between a first camera pose and a second camera pose, the method comprising:
extracting features from a first image captured at the first pose and a second image captured at the second pose, the extracted features comprising location, scale information and a descriptor, the descriptor comprising information that allows a feature from the first image to be matched with a feature from the second image;
matching features between the first image and the second image to produce matched features;
determining a depth ratio of matched features from the scale information, wherein the depth ratio is the ratio of the depth of a matched feature from the first pose to the depth of the matched feature from the second pose;
selecting n matched features, where at least one of the matched features is selected with both the depth ratio and location information; and
calculating the translation and rotation between the first camera pose and the second camera pose using the selected matched features with depth ratio derived from the scale information.

2. A method according to claim 1, wherein n is an integer of 4 or less, m of said n matched features being selected with both the depth ratio and location information and p features being selected with location information and not the depth ratio, m and p being integers satisfying the relation 2m+p=5.

3. A method according to claim 2, wherein m=1 and p=3.

4. A method according to claim 2, wherein m=2 and p=1.

5. A method according to claim 1, wherein the depth ratio is derived from the scale information.

6. A method according to claim 1, wherein the depth ratio is extracted directly from the features.

7. A method according to claim 1, further comprising refining a model using a robust estimator, wherein model parameters are the calculated translation and rotation between the first camera position and the second camera position.

8. A method according to claim 7, wherein using the robust estimator comprises:
setting the model parameters as the best model parameters of a best model;
evaluating the fit of the best model;
selecting a new set of n matched features and calculating new model parameters to produce a new model;
evaluating the fit of the new model;
updating the best model parameters with the new model parameters if the fit of the new model is better than the fit of the best model; and
continually repeating the process of selecting a new set of n matched features to produce a new model, evaluating the fit of the new model and updating the best model parameters with the new model parameters if the fit of the new model is better than the fit of the best model until a stopping criteria is reached.

9. A method according to claim 8, wherein the fit is evaluated by calculating the number of inliers.

10. A method according to claim 8, wherein it is assumed that there is an error in information relating to the depth ratio of matched features,
wherein evaluating the fit of the model comprises evaluating the fit of the model for the depth ratio obtained from the features, the depth ratio with a current error value added and the depth ratio with the current error value,
the method further comprising:
updating the depth ratio with one of the three values selected from depth ratio obtained from the features, the depth ratio with the current error value added and the depth ratio with the current error value subtracted depending on which of the three values produced the best fit;
setting a new error value, the new error value being the current error value divided by 2;
and evaluating the fit of the model using the new error value.

11. A method according to claim 9, wherein the number of inliers is calculated for both depth and location.

12. A method according to claim 8, wherein the stopping criteria is set when the likelihood of finding a better model falls below a threshold.

13. A method according to any claim 1, wherein the first image is captured by a first camera and the second image is captured by a second camera, the first and second cameras being different.

14. A method according to claim 1, wherein the first and second images are captured by a video camera.

15. A method according to claim 14, wherein the video camera is provided on a moving vehicle.

16. A method according to claim 15, wherein the trajectory of the vehicle is determined from the calculated translation and rotation between the first camera pose and the second camera pose.

17. A method of performing simultaneous localization and mapping, using a video camera, wherein the pose of the video camera is estimated using the method of claim 1.

18. A method of determining a 3D model of an object, the method comprising:
 capturing a plurality of images of the object using a moving camera; and
  generating a point cloud of the object, the point cloud being determined from triangulation using the pose of the camera,
  wherein the pose of the camera is estimated according to the method of claim 1.

19. A camera pose estimation apparatus for determining the translation and rotation between a first camera pose and a second camera pose,
 the apparatus comprising a processor, the processor being adapted to:
 extract features from a first image captured at the first pose and a second image captured at the second pose, the extracted features comprising location, scale information and a descriptor, the descriptor comprising information that allows a feature from the first image to be matched with a feature from the second image;
 match features between the first image and the second image to produce matched features;
 determine a depth ratio of matched features from the scale information, wherein the depth ratio is the ratio of the depth of a matched feature from the first pose to the depth of the matched feature from the second pose;
 select n matched features, where at least one of the matched features is selected with both the depth ratio and location information; and
 calculate the translation and rotation between the first camera pose and the second camera pose using the selected matched features with depth ratio derived from the scale information.

20. A non-transitory carrier medium comprising computer readable code configured to cause a computer to perform the method of claim 1.

* * * * *